(12) United States Patent
Ono

(10) Patent No.: US 6,719,083 B2
(45) Date of Patent: Apr. 13, 2004

(54) VEHICLE MASTER CYLINDER ATTACHMENT STRUCTURE

(75) Inventor: Takamune Ono, Tokyo-To (JP)

(73) Assignee: Fuji Jukogyo Kabushiki Kaisha, Tokyo-To (JP)

( * ) Notice: Subject to any disclaimer, the term of this patent is extended or adjusted under 35 U.S.C. 154(b) by 50 days.

(21) Appl. No.: 10/012,307

(22) Filed: Dec. 12, 2001

(65) Prior Publication Data

US 2002/0070605 A1 Jun. 13, 2002

(30) Foreign Application Priority Data

Dec. 12, 2000 (JP) ........................................ 2000-377202

(51) Int. Cl.[7] ............................ B60T 7/22; B60T 13/00; G05G 1/14
(52) U.S. Cl. ............................ 180/274; 74/512; 60/533
(58) Field of Search .......................... 74/512; 180/274; 60/533–594

(56) References Cited

U.S. PATENT DOCUMENTS

| 2,225,315 | A |   | 12/1940 | McCollum ....................... 192/1 |
| 2,844,940 | A | * | 7/1958  | Huber ........................... 60/588 |
| 2,931,179 | A | * | 4/1960  | Mayo ............................ 60/551 |
| 3,430,512 | A | * | 3/1969  | Wossner ....................... 74/512 |
| 4,846,012 | A | * | 7/1989  | Papenhagen et al. ......... 74/512 |
| 4,949,590 | A | * | 8/1990  | Barker et al. ................. 74/512 |
| 5,033,267 | A | * | 7/1991  | Keane ........................... 60/594 |
| 5,195,606 | A | * | 3/1993  | Martyniuk .................. 180/272 |
| 5,520,068 | A | * | 5/1996  | Karch .......................... 74/512 |
| 5,896,781 | A |   | 4/1999  | Muller ......................... 74/512 |
| 5,947,249 | A | * | 9/1999  | Tobiasz ..................... 192/85 C |
| 6,339,971 | B1 |  | 1/2002  | Kato ............................ 74/512 |
| 6,354,171 | B1 | * | 3/2002 | Wolpert et al. ............... 74/512 |
| 6,454,075 | B1 | * | 9/2002 | Leuschke et al. ......... 192/88 S |
| 6,539,823 | B1 | * | 4/2003 | Tomono et al. ............... 74/512 |
| 2002/0184962 | A1 |   | 12/2002 | Saitou et al. ................. 74/512 |

FOREIGN PATENT DOCUMENTS

| DE | 4326183 A1 | * | 2/1994 | .......... B60K/23/02 |
| EP | 1096355 A2 | * | 5/2001 | ............ G05G/1/14 |
| JP | 9-254821   |   | 9/1997 |                      |

* cited by examiner

Primary Examiner—Paul N. Dickson
Assistant Examiner—Laura B. Rosenberg
(74) Attorney, Agent, or Firm—Smith, Gambrell & Russell, LLP

(57) ABSTRACT

An attachment structure for a vehicle master cylinder that suppresses displacement of a pedal towards the rear of the vehicle to make it possible to maintain large legroom in front of the driver's seat. A clutch pedal is fitted to a dashboard via a pedal bracket. The master cylinder is attached to the side surface sections of the pedal bracket by a fastening member at a flange section so as to capable of swinging around a fixed axis extending in the widthwise direction of the vehicle. The master cylinder and the clutch pedal are mechanically connected through a push rod. If an external force greater than a specified value is input, the master cylinder swings around a fixed axis extending in the widthwise direction of the vehicle body. The push rod also swings with the pivot shaft as a fulcrum, accompanying swinging of the master cylinder. Displacement of the master cylinder and the push rod towards the rear of the vehicle is controlled by the swinging itself.

14 Claims, 2 Drawing Sheets

VEHICLE MASTER CYLINDER ATTACHMENT STRUCTURE

BACKGROUND OF THE INVENTION

1. Field of the Invention

The present invention relates to an attachment structure for a vehicle master cylinder activated by a pedal operation to generate hydraulic pressure.

2. Description of the Related Art

Conventionally, a master cylinder used in a clutch mechanism or brake mechanism of a vehicle is arranged inside an engine compartment, as shown, for example, in Japanese Patent Laid-open No. Hei. 9-254821.

However, with a structure where the master cylinder is arranged in the engine compartment, there are a lot of restrictions with respect to layout because various auxiliary components are also arranged inside the engine compartment, together with the engine, etc. For this reason a structure has been considered where the master cylinder is arranged in the vehicle interior, and this master cylinder is attached to a pedal bracket supporting a pedal.

However, with the structure having the master cylinder attached to the pedal bracket, if an external force greater than a specified value acts on the front of the vehicle, the external force is input via the engine to a toe board (dash panel) for partitioning space inside the vehicle and the engine chamber. In this case, since the dash panel is deformed substantially towards the rear of the vehicle body, the master cylinder attached to the pedal bracket is also compressed and displaced towards the rear of the vehicle body. The master cylinder is also mechanically connected to the pedal, and with displacement of the master cylinder to the rear of the vehicle, the pedal is also displaced to the rear of the vehicle. If the pedal is displaced as described above, the legroom in front of the driver's seat is reduced, making it likely for the pedal to interfere with the driver's shins and feet.

The object of the present invention is to provide an attachment structure for a vehicle master cylinder that suppresses displacement of a pedal towards the rear of the vehicle to make it possible to maintain large legroom in front of the driver's seat.

SUMMARY OF THE INVENTION

The attachment structure for a vehicle master cylinder of a first aspect of the present invention, activated by a pedal operation to generate hydraulic pressure, has the master cylinder attached to a pedal bracket supporting the pedal so as to be capable of swinging around a fixed shaft extending in the widthwise direction of the vehicle body.

With this aspect of the invention, the master cylinder is attached to the pedal bracket so as to be capable of swinging around a fixed shaft extending in the widthwise direction of the vehicle body. If an external force greater than a specified value acts on the front of the vehicle and a dash panel is displaced towards the rear of the vehicle to input the external force to the master cylinder, the master cylinder swings around a fixed shaft extending in the widthwise direction of the vehicle body. Because the master cylinder swings, displacement of the master cylinder itself to the rear of the vehicle is suppressed, and displacement of the pedal to the rear of the vehicle accompanying displacement of the master cylinder is thus suppressed. As a result, it is possible to maintain a large degree of legroom in front of the driver's seat.

An attachment structure for a vehicle master cylinder of a second aspect of the invention has the master cylinder attached to the pedal bracket at one point. With this attachment structure for a vehicle master cylinder of the second aspect of the invention, by attaching the master cylinder to the pedal bracket at one point, it is possible to cause the master cylinder to swing easily around a fixed shaft extending in the widthwise direction of the vehicle.

With an attachment structure for a vehicle master cylinder of a third aspect of the invention, the position of attaching the master cylinder to the pedal bracket is further towards the pedal side than towards the center of the master cylinder. With this attachment structure for a vehicle master cylinder of the third aspect of the invention, by having the position of attaching the master cylinder to the pedal bracket further towards the pedal side than the center of the master cylinder, it is possible to cause the master cylinder to swing easily and reliably around a fixed shaft extending in the widthwise direction of the vehicle.

An attachment structure for a vehicle master cylinder of a fourth aspect of the invention has the master cylinder attachment being inclined with respect to the longitudinal direction of the vehicle. With this attachment structure for a vehicle master cylinder of the fourth aspect of the invention, the master cylinder is attached inclined with respect to the longitudinal direction of the vehicle, to cause the master cylinder to swing around a fixed shaft extending in the widthwise direction of the vehicle in an even more reliable and easy manner.

With the vehicle master cylinder attachment structure of the present invention, if an external force greater than a specified value acts on the front of the vehicle, and the eternal force is input through a dashboard to the master cylinder, the master cylinder swings around a fixed axis extending in the widthwise direction of the vehicle body. Displacement of the master cylinder itself to the rear of the vehicle is suppressed by the master cylinder swinging, and displacement of the pedal to the rear of the vehicle accompanying displacement of the master cylinder is thus also suppressed. According to the present invention, therefore, displacement of a pedal towards the rear of the vehicle is suppressed, making it possible to maintain a substantial amount of legroom in front of the driver's seat.

DETAILED DESCRIPTION OF THE PREFERRED EMBODIMENTS

Figure 1:
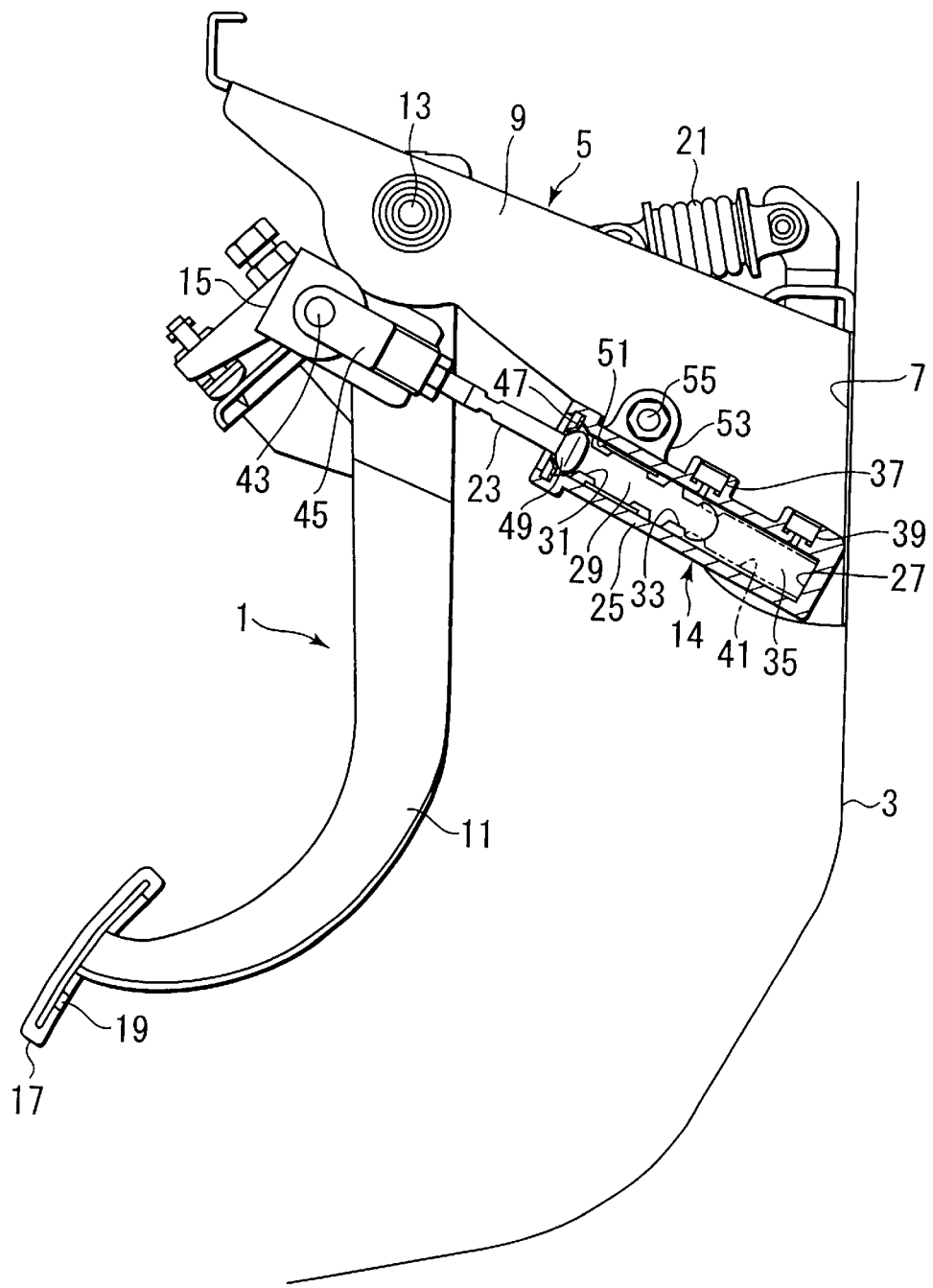
FIG. 1 is a side elevation showing a vehicle master cylinder attachment structure of an embodiment of the present invention.

Embodiments of a vehicle master cylinder attachment structure of the present invention will now be described with reference to the drawings. In the description of the drawings, the same reference numerals are attached to the same elements, and duplicated description thereof is omitted. This embodiment applies the present invention to a master cylinder attachment structure used in a vehicle clutch mechanism.

First of all, referring to FIG. 1, a vehicle master cylinder attachment structure of an embodiment of the present invention will be described. FIG. 1, is a side elevation showing a vehicle master cylinder attachment structure of this embodiment.

A clutch pedal 1 is fitted to a dash panel 3 via a pedal bracket 5. The pedal bracket 5 functions as a support member for supporting the clutch pedal 1, and this pedal bracket 5 has a front surface part screwed to the dash panel 3 with bolts (not shown). A pair of side surface sections 9 opposite to each other and extending rearwards are provided on the pedal bracket connecting to the front surface section 7.

A pedal shaft 13 extending in a widthwise direction of the vehicle to a base end of a pedal bar 11 is fitted to the clutch pedal 1. This clutch pedal 1 is supported in a hole formed at a position corresponding to the side surface sections 9, in a state extending in a widthwise direction of the vehicle. The clutch pedal 1 swings axially around the center of the pedal shaft 13. A pedal arm 15 for activating a master cylinder 14 is fixed to a specified position on the base end side of the pedal bar 11. Also, a foot pedal 19 covered by a pedal pad 17 is fixed to the lower end of the pedal bar 11.

In this embodiment, an assist mechanism is adopted in order to reduce the clutch operating force to the clutch pedal 1. This assist mechanism is constructed so that when the clutch pedal 1 is pressed down treading force is reduced at the latter half of treading down when the clutch pedal 1 becomes heavy, thus abutting an assist spring 21, and assisting the treading force using the urging force of the assist spring 21 at the latter half of treading down.

The master cylinder 14 is connected to the pedal arm 15 through a push rod 23, and hydraulic pressure is produced by the driver for operating the clutch pedal 1. The master cylinder 14 has a cylinder hole 27 formed inside an oblong cylinder body 25. A piston 29 to which hermetic sealing members 31 and 33 are fitted is inserted into the cylinder hole 27 so as to be water tight and capable of movement, and a hydraulic pressure generating chamber 35 is defined at the front of the piston 29 (the right of the drawing, and this applies in the following).

An input port 37 and an output port 39 capable of communicating with the hydraulic pressure generating chamber 35 are formed in the cylinder body 25. The input port 37 is connected to a reservoir, not shown, and is positioned substantially centrally in the longitudinal direction of the cylinder body 25. The output port 39 is connected to an operating cylinder, not shown, and is positioned to the front in longitudinal direction of the cylinder body 25. A return spring 41 is provided between the front end of the piston 29 and a front wall of the cylinder hole 27, and the piston 29 is urged to the rear by the resilient force of the return spring 41 (to the left in the drawing, and this also applies in the following).

The push rod 23 is linked to a yoke 45 that pivots at a front end of the pedal arm 15 using a pivot shaft 43, and is supported so as to be capable of swinging with the pivot shaft 43 as a pivot point. The push rod 23 has a front end inserted inside the cylinder body 25, and is prevented from coming out by a snap ring 47 attached to the cylinder body 25. In this way, the master cylinder 14 and the push rod 23 are mechanically linked together. Also, a large diameter head section 49 is provided at a front end of the push rod 23 inserted inside the cylinder body 25, and the large diameter head section 49 comes into contact with an indent 51 formed at a rear end of the piston 29.

The large diameter head section 49 and the indent 51 of the piston 29 are respectively formed in an annular shape, and even when the push rod 23 swings with the pivot shaft 43 as a fulcrum upon operation treading of the clutch pedal 1, the contact state of the indent 51 and the large diameter head section 49 can be maintained. The master cylinder 14 and the push rod 23 connected in this way are linked so that a central axis of the piston 29 and a central axis of the push rod 23 are substantially on a straight line when not activated with no operation of the clutch pedal 1.

With the master cylinder 14 having the above described structure, the push rod 23 moves forward while swinging with the pivot shaft 43 as a fulcrum under operation of the clutch pedal 1, and the piston 29 moves forward inside the cylinder hole 27. With the advancing of the piston 29, the hydraulic fluid of the hydraulic pressure generating chamber 35 is gradually pressurized. The hydraulic fluid pressurized in the hydraulic pressure generating chamber 35 is conveyed from the output port 39 to a differential cylinder. If the treading operation of the clutch pedal 1 is stopped, the piston 29 is returned by the return spring 41. If the piston 29 moves to the return limit, the input port 37 and the hydraulic pressure generating chamber 35 become linked, and the hydraulic fluid flows into the hydraulic pressure generating chamber 35.

The master cylinder 14 is attached to the side surface sections 9 of the pedal bracket 5 so as to be capable of swinging around a fixed axis extending in the widthwise direction of the vehicle. One flange section 53 for attaching the master cylinder 14 to the side surface sections 9 of the pedal bracket 5 is formed on the cylinder body 25. The master cylinder 14 is attached to the pedal bracket 5 at a single point of the flange section 53. In this way, it is made easy for the master cylinder 14 to swing, by attaching the master cylinder 14 to the side surface sections 9 at a single point of the flange section 53.

Also, the flange section 53 is positioned further rearward than the input port 37, and the position of attaching the master cylinder 14 to the pedal bracket 5 becomes more to the clutch pedal 1 side than the central longitudinal direction of the master cylinder 14. In this way, the position of the flange section 53 is further rearward than the central longitudinal direction of the master cylinder 14, which means that the master cylinder 14 can reliably and easily swing.

The master cylinder 14 is then attached to the side surface sections 9 at the flange section 53 by the fastening members 55 such as nuts and bolts. The fastening members 55 are orthogonal to the side surface sections 9 and extend in the widthwise direction of the vehicle, with central axes of the fastening members 55 constituting the fixed shaft extending in the widthwise direction of the vehicle described above. Fastening force of the fastening members 55 is set so that the master cylinder 14 does not swing when there is a normal treading operation of the clutch pedal 1, but does swing when an external force greater than a specified value acts on the front of the vehicle.

The master cylinder 14 is attached inclined with respect to the longitudinal direction of the vehicle, so that at an inactive time when there is no treading operation of the clutch pedal 1 the side of the master cylinder 14 to the front of the vehicle body faces downwards. In this way, by attaching the master cylinder at an incline with respect to the longitudinal direction of the vehicle, the master cylinder 14 can swing in a more reliable and easy manner.

Figure 2:
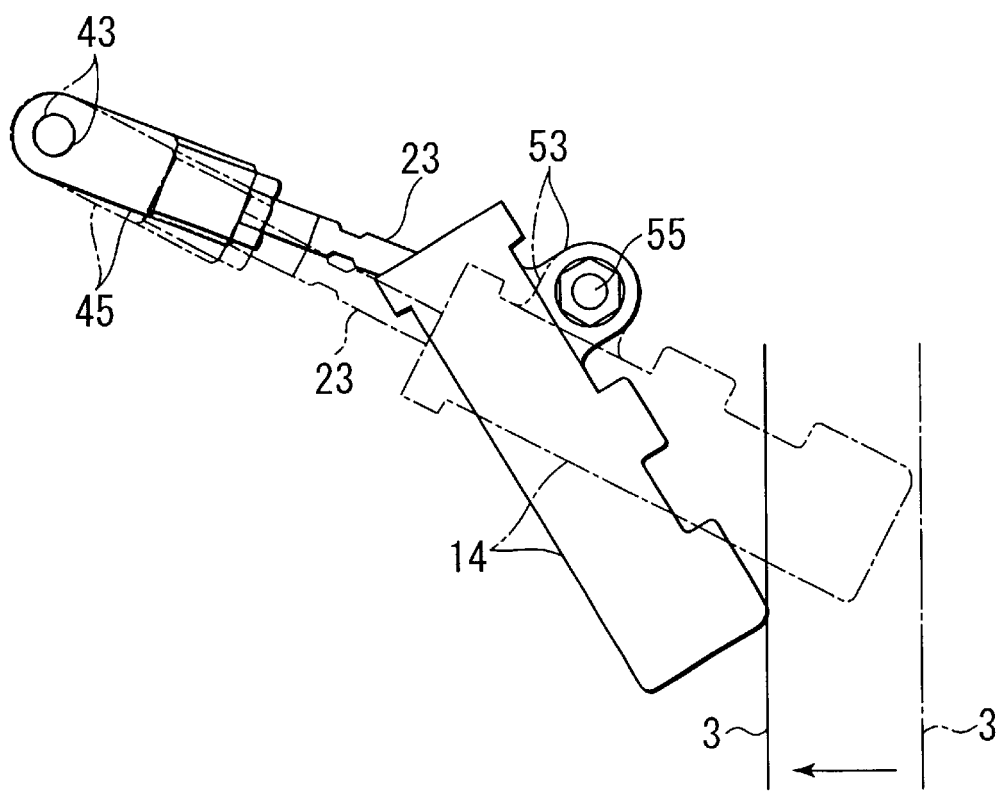
FIG. 2 is a drawing for describing movement of a master cylinder in the event of input of external force, in the vehicle master cylinder attachment structure of the embodiment of the present invention.

If an external force greater than a specified value is input to a vehicle adopting the vehicle master cylinder attachment structure of this embodiment, from the front of the vehicle, the dash panel 3 and the pedal bracket 5 are compressed substantially in a longitudinal direction of the vehicle. If an external force greater than a specified value is input to the master cylinder 14 due to deformation in the longitudinal direction of the dash panel 3 and the pedal bracket 5 due to compression, then as shown by the solid line in FIG. 2, the master cylinder 14 swings in a clockwise direction in the drawing centering around a fixed axis extending in the widthwise direction of the vehicle (fastening means central axis). The part of the master cylinder 14 to the front of the vehicle is displaced to the rear of the vehicle, while the part of the master cylinder 14 to the rear of the vehicle is displaced to the front. The one dotted line in FIG. 2 shows the state when there is no external force as described above input to the vehicle.

On the other hand, the large diameter head section 49 of the push rod 23 and the indent 51 of the piston 29 are formed in an annular shape, which means that even in the event that the master cylinder 14 swings, the mechanical linkage between the push rod 23 and the piston 29 is maintained. For this reason, the push rod 23 swings in an anticlockwise direction in the drawing with the pivot shaft 43 as a fulcrum, accompanying swinging of the master cylinder 14.

In this way, with the vehicle master cylinder attachment structure of this embodiment, in the event that an external force greater than a specified value is input to the master cylinder 14, since the master cylinder 14 and the push rod 23 swing, the displacement of the master cylinder 14 and the push rod 23 in the longitudinal direction of the vehicle can be suppressed. As a result, displacement of a pedal 1 towards the rear of the vehicle is controlled, making it possible to maintain large legroom in front of the driver's seat.

Also, since the master cylinder 14 is attached to the side surfaces 9 of the pedal bracket 5 at a single point of the flange section 53, if an external force greater than a specified value is input it is easy for the master cylinder 14 to swing.

The position of the flange section 53 formed on the master cylinder 14 is further towards the clutch pedal 1 than the central longitudinal direction of the master cylinder 14, which means that the master cylinder 14 can reliably and easily be allowed to swing.

Further, the master cylinder is attached at an incline with respect to the longitudinal direction of the vehicle, which means that the master cylinder 14 can more reliably and easily be allowed to swing.

The present invention is not limited to the above described embodiments. In these embodiments the present invention has been applied to an attachment structure for a master cylinder 14 used in a clutch mechanism of a vehicle, but this is not limiting, and it is also possible to apply the present invention to an attachment structure for a master cylinder used in a vehicle brake assembly.

What is claimed is:

1. A mounting structure for a vehicle master cylinder activated by a pedal to generate hydraulic pressure, comprising:
   a pedal bracket for swingably supporting said pedal, said pedal bracket being fixed on a dash panel of a vehicle;
   a master cylinder having a cylinder extending along a longitudinal direction of the vehicle and a piston slidably inserted into said cylinder, said piston being connected to said pedal with a pushrod; and
   one or more fastening members having a lateral axis extending in a widthwise direction of the vehicle for fastening cylinder to said pedal bracket with a specified fastening force, said one or more fastening members being capable of swingably supporting said cylinder around said lateral axis;
   wherein said specified fastening force is set such that said cylinder does not swing around said lateral axis when said pedal is operated but said cylinder swings around said lateral axis when the dash panel is deformed and pushes the front end of the cylinder backwards.

2. The mounting structure according to claim 1, wherein said cylinder is fastened to the pedal bracket such that a longitudinal axis thereof inclines with respect to the longitudinal direction of the vehicle.

3. The mounting structure according to claim 1, wherein said one or more fastening members fasten the cylinder at a portion behind a longitudinal center portion thereof.

4. The mounting structure according to claim 1, wherein said one or more fastening members comprise a bolt and a nut.

5. The mounting structure according to claim 1, wherein said master cylinder is positioned in its entirety, relative to the longitudinal direction, between said dash panel and a pivot axis of said pedal.

6. The mounting structure according to claim 1, wherein the dash panel comprises;
   a first side associated with an inside passenger compartment of a vehicle, and
   a second side associated with an engine chamber, and
   wherein the pedal bracket contacts the first side.

7. The mounting structure according to claim 1, wherein the push rod comprises a head section having an annular shape, and said piston having an annular shaped indent surface in contact with said head section.

8. A mounting structure for a vehicle master cylinder activated by a pedal to generate hydraulic pressure, comprising:
   a pedal bracket for swingably supporting said pedal, said pedal bracket being fixed on a dash panel of a vehicle;
   a master cylinder having a cylinder extending along a longitudinal direction of the vehicle and a piston slidably inserted into said cylinder, said piston being connected to said pedal with a pushrod; and
   a fastening member for fastening said cylinder to said pedal bracket with a specified fastening force, said fastening member having a lateral axis extending in a widthwise direction of the vehicle and being capable of swingably supporting said cylinder around said lateral axis;
   wherein said fastening force is set such that said cylinder does not swing around said lateral axis when said pedal is operated but said cylinder swings around said lateral axis when the dash panel is deformed and pushes the front end of the cylinder backwards.

9. The mounting structure according to claim 8, wherein said cylinder is fastened to the pedal bracket such that a longitudinal axis thereof inclines with respect to the longitudinal direction of the vehicle.

10. The mounting structure according to claim 8, wherein said fastening member fastens the cylinder at a portion behind a longitudinal center portion thereof.

11. The mounting structure according to claim 8, wherein said fastening member comprises a bolt and a nut.

12. The mounting structure according to claim 8, wherein said master cylinder is positioned, in its entirety relative to the longitudinal direction, between said dash panel and a pivot axis of said pedal.

13. The mounting structure according to claim 8, wherein the dash panel comprises;
   a first side associated with an inside passenger compartment of a vehicle, and a second side associated with an engine chamber, and wherein the pedal bracket contacts the first side.

14. The mounting structure according to claim 8, wherein the push rod comprises a head section having an annular shape, and said piston having an annular shaped indent surface in contact with said head section.

* * * * *